Sept. 8, 1942.    D. L. KAUFMAN    2,294,988
REFRIGERATING APPARATUS
Filed May 28, 1937
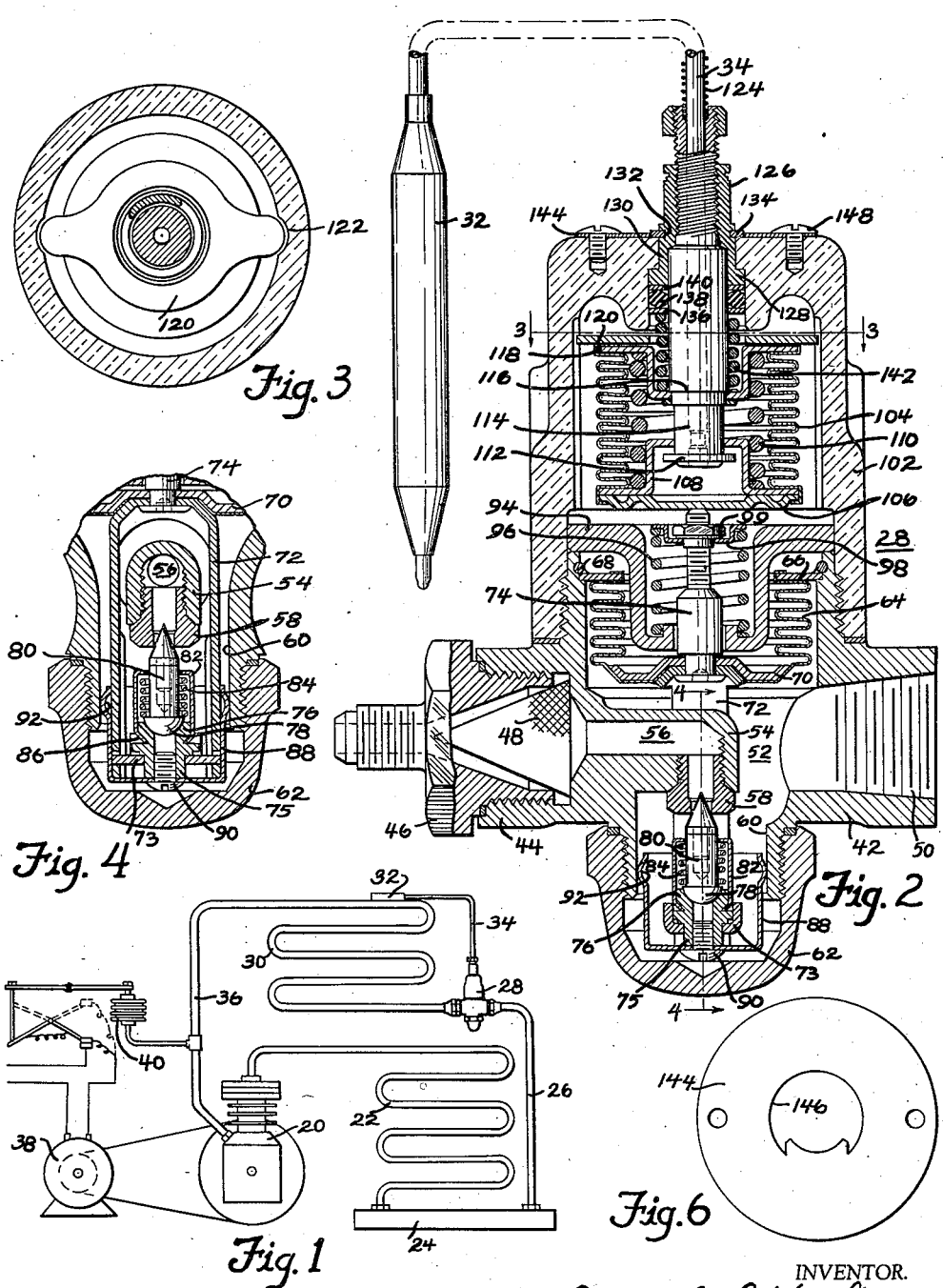
INVENTOR.
Daniel L. Kaufman
BY Spencer Hardman and Fehr
ATTORNEYS Patented Sept. 8, 1942

2,294,988

UNITED STATES PATENT OFFICE 2,294,988

REFRIGERATING APPARATUS

Daniel L. Kaufman, Dayton, Ohio, assignor to General Motors Corporation, Dayton, Ohio, a corporation of Delaware Application May 28, 1937, Serial No. 145,317

4 Claims. (Cl. 285—25)

This invention relates to refrigerating apparatus and more particularly to fluid pressure operating valves.

In refrigerant expansion valves there is considerable problem in preventing the access of moisture and air containing moisture to the operating and control bellows of the valve, since such a valve is used in a rather cold portion of the system and moisture tends to freeze onto all metal parts thereof. In order to prevent this freezing of moisture upon operating parts of the valve, it is customary to seal the valve casing. This is comparatively simple where no external thermostat tube is used or any external adjustment is provided. However, where an external tube is employed, it is imperative that a seal be provided. Likewise, where an external adjustment is used, it is also imperative that a seal be provided. Heretofore, several manually adjusted packing glands have commonly been provided.

It is an object of my invention to provide an improved construction wherein a single automatic adjustable packing gland provides a seal for both the adjusting means and the thermostat, too.

Considerable valve trouble is also caused by misalignment of the valve needle with the valve seat in power-operated valves.

It is an object of my invention to provide a full floating valve needle and support of an advantageous construction in order to overcome difficulties of misalignment between the valve needle and its seat.

It is still another object of my invention to provide an improved return spring support which also has sufficient insulating value to serve as an insulating means.

It is another object of my invention to provide an improved locking means for the adjusting means and external tube.

Further objects and advantages of the present invention will be apparent from the following description, reference being had to the accompanying drawing, wherein a preferred form of the present invention is clearly shown.

In the drawing:

Fig. 1 is a diagrammatic view of a refrigerating system incorporating a thermostatic automatic expansion valve embodying my invention;

Fig. 2 is a sectional view through the thermostatic expansion valve shown in Fig. 1;

Fig. 3 is a sectional view taken along the lines 3—3 of Fig. 2;

Fig. 4 is a sectional view taken along the lines 4—4 of Fig. 2;

Fig. 5 is a plan view of the split washer shown in section in Fig. 2; and

Fig. 6 is a plan view of the top plate of the valve shown in section in Fig. 2.

Briefly, I have shown a refrigerating system diagrammatically containing a thermostatic automatic expansion valve incorporating a spring pressed rubber-like seal which makes sealing contact between the thermostat tube and the casing of the valve and is provided with a ring which bears against the inner end of the adjusting sleeve. This adjusting sleeve is provided with a flange on its inner side which bears against the casing and a split washer on its outer side which bears against the outer face of the casing so as to hold the sleeve adjustment in position in the bearing provided for it in the casing. A top plate has an opening which receives the split washer. This top plate is held in place by screws in order to hold the split washer in place. The pressure operated bellows is provided with the usual yoke having a socket which receives the rounded head of a valve needle which has its head held in the socket by a tapered coil spring in order to permit universal movement of the valve needle.

Referring now to the drawing and more particularly to Fig. 1, there is shown a refrigerating system including a compressor 20 for compressing the refrigerant and for forwarding the compressed refrigerant to a condenser 22 where the compressed refrigerant is liquefied and collected in the receiver 24. From the receiver 24 the liquid refrigerant is forwarded through a supply conduit 26 to a thermostatic automatic expansion valve 28 which controls the flow of liquid refrigerant into the evaporating means 30. This thermostatic automatic expansion valve 28 has a thermostatic bulb 32 fastened to the outlet of evaporator 30 and connected to the thermostatic element of the automatic expansion valve by a small capillary tube 34.

The refrigerant evaporates within the evaporator 30 under reduced pressure and is returned to the compressor through the return conduit 36. The compressor 20 is driven by an electric motor 38 through pulley and belt means under the control of a snap-acting low pressure switch 40 which has its operating bellows connected to the return conduit 36.

Referring now more particularly to the remaining figures of the drawing, the valve 28 is provided with a valve body 42 preferably of forged brass or other suitable material. This valve body is provided with an inlet opening 44 which receives a connector 46 which holds a cone-shaped strainer 48 within the inlet opening. The valve body is also provided with the outlet opening 50 and a valve chamber 52 into which extends a projection 54 containing an inlet passage 56 which is threaded to receive a removable valve seat member 58. Below the valve seat member 58 is a guideway 60 which is threaded externally to receive a cap member 62. The upper wall of the valve member 52 is closed by a phosphor bronze bellows 64 having its upper end connected by a ring 66 to the upper portion of the valve body 42 through the medium of a ring 68 which snaps into a groove formed within the upper wall, all of which is thereafter soldered to provide a permanent fluid tight joint.

The lower end of the bellows 64 is provided with an internal reinforcing member 70 which is fastened to the upper end of a yoke 72 by a stud member 74. The lower end of this yoke is provided with a cross member 73 which in turn is provided with a needle socket stud 75 having a spherical socket 76 which receives the hemispherical head 78 of the needle valve 80 which has its upper conical end extending into the removable valve seat member 58. A spring cage 82 surrounds the valve needle and has an upper flange which receives the upper end of the conical spring 84 having its lower end bearing against the head 78 of the needle valve. The lower end of this spring retainer 82 has portions 86 struck or bent into recesses in the portion of the needle socket stud for holding the spring cage in place. This spring cage is also held by the sides of the yoke cross member 73 which in turn is held in position in the yoke by a cup-shaped guide member 88 held in place by a small screw 90 which is threaded into the needle socket stud. This guide member 88 is provided with four or more struck-out projections 92 which bear against the inner cylindrical wall 60 which is made concentric within the limits of the best manufacturing accuracy with the seat member 58 and its seat.

By this construction the struck-out portions 92 accurately guide the bottom of the yoke in a vertical direction, and the valve needle is permitted a certain amount of variation by its ball and socket type of connection provided by its head and the socket in the needle socket stud. The spring cage opening for the valve needle is slightly larger than the valve needle so that it permits a limited movement of the valve needle to correct any small misalignment of the needle and its seat. This amount of free movement is always greater than the manufacturing errors so that substantially perfect seating conditions can be obtained.

Resting upon the upper edge of the valve body 42 is an insulating member 94 and a recess provided with a flange for receiving the compression type coil spring 96 which surrounds the stud 74. The upper end of this spring is retained by an upper spring retainer 98 which is held in position upon stud member 74 by a thin nut 99. The thin nut 99 may be threaded upwardly or downwardly to adjust the tension of the coil spring 96. The insulating member 94 prevents heat conduction from the bellows 64 and the valve body into the upper portion of the valve. The upper portion of the valve is enclosed by an inverted cap member 102 of insulating material which cap, with the valve body, forms a casing for the entire valve. This cap member 102 has internal threads in its lower end which are threaded onto the external threads provided upon the upper portion of the forged brass valve body 42. This cap member also holds the insulating member 94 laterally in place while the compression spring 96 always holds the insulating member in engagement with the upper edge of the valve body 42.

Within the cap member 102 is an upper expansion element including a bellows 104 having lower end plates 106 and 108. The end plate 106 rests upon the upper end of the stud 74 while the end plate 108 rests upon the end plate 106 and receives the lower end of the compression type coil spring 110. This end plate 108 also receives the head 112 of the bellows stem 114. This bellows stem is provided with a shoulder 116 which supports the upper end plate 118 of the bellows 112. The compression spring 110 extends between the end plates 108 and 118 and tends to urge the upper end plate 118 against the shoulder 116 and the lower end plate 108 against the head 112 of the hollow bellows stem 114. Fastened to the top of the upper end plate 118 is the power element guide 120 which has ears extending at 180° from each other into grooves 122 formed upon the inner wall surface of the cap member 102.

The upper end of the hollow bellows stem member receives the small capillary tube 34 which, near the bellows stem, is surrounded by a small spring 124 in order to prevent too sharp a bending of this tube 34. The hollow bellows stem member is threaded at its upper end, and threaded onto it is a sleeve type of adjusting member 126 provided with a flange 128 at its lower end which bears against the shoulder in the central aperture 130 of the cap member. This adjusting member 126 is also provided with a groove 132 which receives a split washer 134 which bears against the outer face of the cap member 102.

Beneath the flange 128 is a ring 138 of a rubber-like material such as a polymer of chloro-2-butadiene-1,3 or common soft rubber. On either side of this ring is a metal ring 136 and 140. Beneath the metal ring 136 is a compression type coil spring 142 which extends between the ring 136 and a recessed portion of the upper bellows end member 118. This spring tends to squeeze the rubber-like ring 138 tightly between the two metal rings 136 and 140 so that the rubber-like ring will be forced into sealing engagement with the inner wall of the aperture 130 and the outside of the hollow stem 114. This provides a packing gland which is automatically adjusted and which automatically has the proper pressure upon the gasket element. This is the only seal necessary for the bellows stem which forms a part of the tube connecting the bellows 104 and the thermostatic bulb 32. It is also the only seal for the sleeve type adjusting member 126.

The entire thermostatic assembly, excepting the split washer 134, is assembled into place by first threading the thermostatic bulb 32 through the aperture in the cap member from the inside and drawing the entire assembly through the aperture until the flange 128 is drawn against its shoulder in the aperture 130. Then the split washer is slipped into place in the groove 132 which is provided for it. After this, a top plate 144 is slipped over the thermostatic bulb, the tube 34, the adjusting member 126, and the split washer 132 and then fastened in place by the screws 148 in order to prevent the split washer 134 from becoming dislodged. This top plate 144 has an aperture 146 which is practically the same shape as the outside of the split washer 134. It, however, could be merely a concentric hold having a slightly greater diameter than the outside of the split washer 134.

While the form of embodiment of the invention as herein disclosed, constitutes a preferred form, it is to be understood that other forms might be adopted, all coming within the scope of the claims which follow.

What is claimed is as follows:

1. In combination, a casing means for confining a gas and provided with an aperture therein, a first means for providing a connection between the exterior and the interior of said casing means extending through said aperture, a single rotatable adjustment means cooperating with the first means and the casing means and having a bearing upon one of said cooperating means and being in threaded engagement with the other of said cooperating means for adjusting the position of the first means with respect to the aperture in the casing means, and a gas-tight sealing member located within the casing means and held in sealing engagement with the casing means and the first means for sealing the casing means.

2. In combination, a casing means for confining a gas and provided with an aperture therein, a first means for providing a connection between the exterior and the interior of said casing means extending through said aperture, a single rotatable adjustment means cooperating with the first means and the casing means and having a bearing upon one of said cooperating means and being in threaded engagement with another of said cooperating means for adjusting axially the first means with respect to the aperture, a gas-tight sealing member held in sealing engagement with the casing means and the first means for sealing the casing means, a washer between said sealing member and said adjustment means, and spring means located within the casing means for holding said sealing means against said washer.

3. In combination, a casing provided with an aperture therein, a first member for providing a connection between the exterior and the interior of said casing extending through the aperture in the casing, and adjusting means coaxially surrounding said first member and entering into said aperture in said casing for adjusting axially the position of said first member with respect to said casing, said adjusting means being provided with a shoulder thereon, a split washer engaging said shoulder and casing for holding the adjusting means in place, and a plate upon the outside of the casing for holding the split washer in place.

4. In combination, a casing provided with an aperture therein, a first member for providing a connection between the exterior and the interior of said casing extending through the aperture in the casing, and adjusting means coaxially surrounding said first member and entering into said aperture in said casing for adjusting axially the position of said first member with respect to said casing, said adjusting means being provided with shoulder means upon the inside of the casing for engaging the casing to prevent outward movement of the adjusting means, said adjusting means being also provided with a shoulder means upon the outside of the casing, a split washer on the outside of the casing engaging said shoulder means on the outside of the casing as well as the casing for holding the adjustment means in place, and a plate fastened to and located upon the outside of the casing for holding the split washer in place.

DANIEL L. KAUFMAN.